United States Patent [19]
Brieske

[11] 3,920,500
[45] Nov. 18, 1975

[54] METHOD OF MAKING FLEXIBLE PLASTIC ARTICLES

[75] Inventor: Bernard F. Brieske, Palatine, Ill.

[73] Assignee: Vision-Wrap Industries, Inc., Palatine, Ill.

[22] Filed: Nov. 21, 1973

[21] Appl. No.: 418,109

[52] U.S. Cl. .............. 156/251; 156/253; 156/277; 156/289; 161/44; 2/169
[51] Int. Cl..... B32b 1/04; B32b 31/12; B32b 31/18
[58] Field of Search ........... 156/251, 253, 277, 289; 161/44, 40, 99

[56] References Cited
UNITED STATES PATENTS

| | | | |
|---|---|---|---|
| 1,625,394 | 4/1927 | Roberts | 156/251 |
| 1,668,782 | 5/1928 | Roberts | 156/251 |
| 3,028,576 | 4/1962 | Gerard | 156/251 |
| 3,329,548 | 7/1967 | Blatz | 156/251 |
| 3,579,397 | 5/1971 | Schwartzkopf | 156/251 |
| 3,625,790 | 12/1971 | Ayres | 156/251 X |
| 3,657,033 | 4/1972 | Sager | 156/251 X |

FOREIGN PATENTS OR APPLICATIONS 996,615   6/1965   United Kingdom................. 156/251

*Primary Examiner*—Philip Dier
*Attorney, Agent, or Firm*—McDougall, Hersh & Scott

[57] ABSTRACT

Flexible plastic structures and a method for producing the structures. Plastic sheets are employed for forming four film layers, and heat sealing means secure the films around peripheral portions thereof whereby the films define an assembly having the shape of a puppet, a glove or other type article. A perforated line is formed adjacent one edge of the assembly of four films, and when a strip is torn away along this line, free edges of the films are exposed. The films are then adapted to be separated into separate pairs, and each pair then serves independently, for example, as a glove for one hand.

4 Claims, 8 Drawing Figures

METHOD OF MAKING FLEXIBLE PLASTIC ARTICLES

This invention is directed to the formation of articles from plastic film. In particular, the invention concerns the production of puppets, gloves and other articles wherein pairs of the articles are automatically formed during the production operation with the pairs being in assemblies for handling purposes. The individual members of a pair can be readily separated from the assembly when these members are ready for use.

The formation of various articles from flexible plastic films is well known. In particular, various methods have been proposed for the formation of puppets, gloves and like articles wherein the articles are located on a finger or on the hand during use. A description of such articles is found, for example, in Gerard Pat. No. 3,028,576, issued on Apr. 3, 1962 and entitled "Methods and Apparatus for Making Thin Plastic Gloves." In the formation of products of this type, it is important to utilize manufacturing techniques which are quite efficient so that the cost of the articles will not be unduly increased.

It is a general object of this invention to provide an improved flexible plastic article, and an improved method for its manufacture.

It is a more specific object of this invention to provide a flexible plastic article of the type described which can be manufactured on a high production basis and which comprises the formation of a pair of individual articles initially formed in an assembly for simplified handling and which at the same time includes means for readily separating the articles for purposes of use.

It is a still further object of this invention to provide an improved method and flexible plastic structure suitable for use in the production of articles which can be located in direct contact with food products without any danger of contamination of the products.

These and other objects of this invention will appear hereinafter and for purposes of illustration, but not of limitation, specific embodiments of the invention are shown in the accompanying drawings in which.

The construction of this invention generally comprises four film layers which are heat sealed around their periphery to form a unitary construction. A tear strip is attached to the construction along a perforated line to enable removal of the tear strip. Upon removal, free film edges are exposed whereby the films can be separated into pairs so that each pair becomes independent of the unitary construction. Each pair defines an opening between the film portions thereof defined by the free film edges whereby a hand, finger or other article can be inserted in the openings.

In accordance with a preferred form of the invention, the constructions involve the use of plastic sheets having printed material on one surface and printed surface portions are brought into facing relationship when the sheets are folded. Upon heat sealing, these printed surfaces are then maintained out of position for contact with food or other sensitive areas to which the constructions are exposed.

A typical use of constructions of the type described may comprise insertion into a cereal box, and in such cases, only unprinted surfaces are exposed to the food. Applicant's structures do not require any separate packaging which is usually necessary when printed surfaces are provided. Applicant's arrangement, by concealing the printed surfaces, avoids the necessity for separate packaging.

Figure 1:
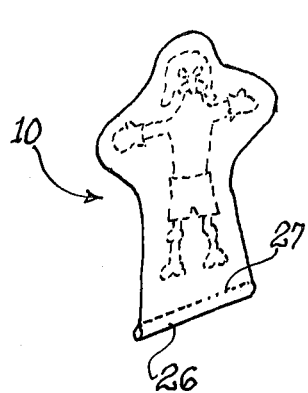
FIG. 1 is a perspective view of an assembly of plastic articles characterized by the features of this invention.
Figure 2:
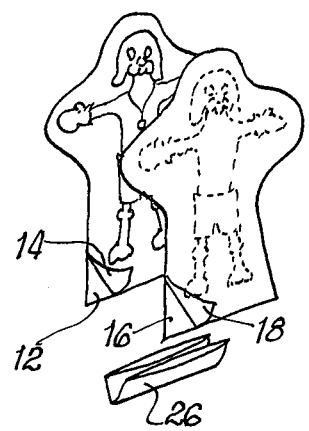
FIG. 2 is a perspective view illustrating articles after separation thereof.

The accompanying drawings illustrate applicant's product and techniques for the production of the product. FIG. 1 illustrates a construction 10 comprising a flexible plastic article. FIG. 2 illustrates the article in separated form, and it will be noted that the article includes a first sheet 12 and a second sheet 14 located in overlying relationship relative to the sheet 12. The sheet 14 comprises a printed surface, and this printed surface is positioned in facing relationship with the printed surface on sheet 16. An outer flexible film portion 18 is also included in the assembly.

A tear strip 26 is provided along a bottom edge of the product, and the tear strip is separated from the main body of the construction by means of a perforated line 27.

Figure 3:
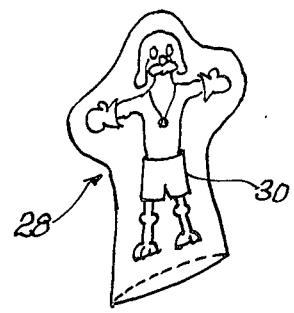
FIG. 3 is a perspective view of an individual separated article.

The construction illustrated is designed for use by children, and the individual members making up the construction are dimensioned to receive the finger of a child whereby each assembly comprises a pair of miniature puppets. An individual puppet 28 is shown in FIG. 3, and this puppet defines a printed surface 30. This surface is preferably provided with an ethyl cellulose coating or other known material so that the opposing puppet faces will not adhere to each other during the heat sealing operation.

Figure 5:
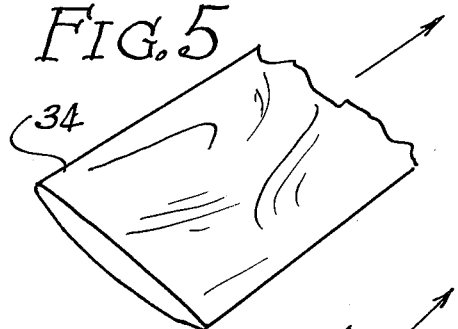
FIG. 5 is a perspective view illustrating a tubular plastic sheet adapted for use in the formation of the articles.
Figure 6:
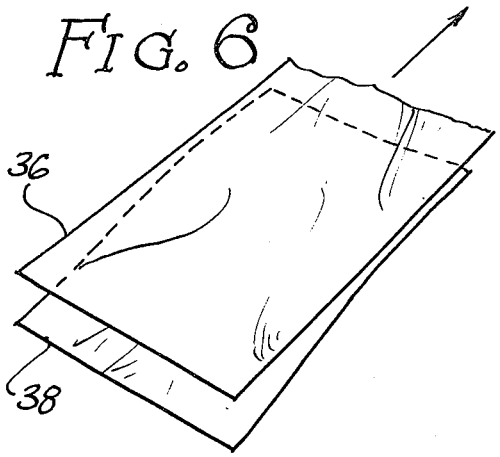
FIG. 6 is a perspective view illustrating a pair of overlying plastic films which can be alternatively used in the formation of the articles of the invention.
Figure 7:
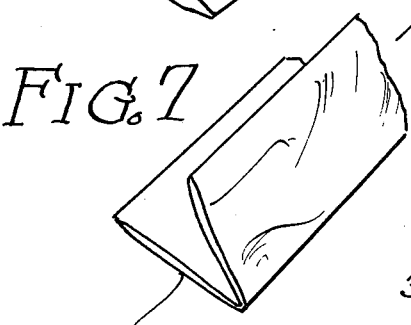
FIG. 7 is a perspective view illustrating folding of the flexible plastic tubing of FIG. 5; and, FIG. 8 is a perspective view illustrating folding of the flexible plastic film of FIG. 6.
Figure 8:
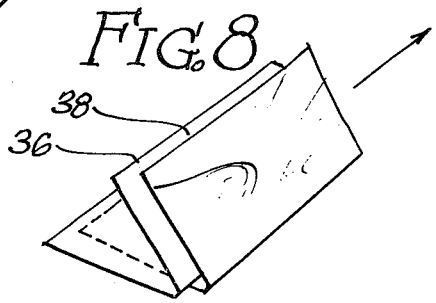

In the formation of the products of the invention, a supply 32 of flexible film is preferably employed. As shown in FIG. 5, this supply may comprise a tubular length 34 which, when folded as shown in FIG. 7, will provide the four thicknesses of film. On the other hand, two separate film sheets 36 and 38 may be supplied as shown in FIG. 6. These sheets may then be folded simultaneously as shown in FIG. 8 to again provide the four thicknesses of film.

Figure 4:
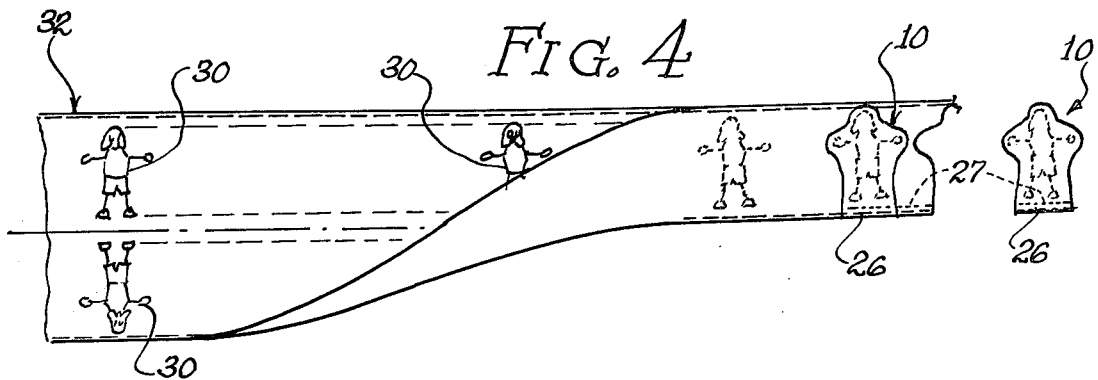
FIG. 4 is a plan view illustrating the manner in which the articles are produced on a production line basis.

Any suitable means, for example, an A-frame construction may be utilized for folding the continuous length of film as illustrated in FIG. 4. The printed areas 30 are formed on the film prior to folding, and these printed areas are located in face-to-face relationship on the interior of the folded film.

A standard die cutting and heat sealing tool is preferably used for purposes of forming the desired configuration from the continuous length of folded film. This arrangement will, therefore, result in the separation of individual constructions 10 from the film, and these constructions are produced on a continuous basis for maximum production efficiency. A standard perforating tool is employed for forming the tear strip 26, this perforation preferably occurring on a continuous basis just prior to the die cutting operation.

As indicated, the construction of the invention is highly suitable for the formation of a pair of puppets, and in a typical embodiment of the invention, these puppets are finger-size. This makes the constructions 10 ideally suited for use as favors in cereal boxes and the like. When the tear strip 26 is removed, the puppets are easily separated, particularly where the aforementioned coating is provided on the printed surface. The other film surfaces which do not have this coating are securely heat sealed to each other whereby the individual puppets are suitably fastened together.

Another suitable use of the invention involves the production of gloves with the only differences being the size and configuration thereof. The arrangement of the invention provides a highly suitable marketing feature since a pair of gloves will automatically be formed into a unitary construction. This unitary construction, which need not be packaged in any way, will avoid separation of the pairs until the purchaser of the gloves is ready to use them.

It will be understood that various changes and modifications may be made in the above described construction which provide the characteristics of the invention without departing from the spirit thereof particularly as defined in the following claims.

That which is claimed is:

1. A method for the production of flexible plastic articles comprising the steps of locating a pair of flexible plastic films in overlying relationship, applying printing on one exposed surface of one film, folding the films whereby printed portions thereof are located in face-to-face relationship and whereby four thicknesses of film are provided with a foldline defined along one side thereof, die cutting the film through said four thicknesses, the resulting die cut defining an edge on each article extending from said foldline around the periphery of the article and back to the foldline whereby an intact foldline portion remains on each article, heat sealing each article around said periphery thereof, and perforating each article along a line spaced closely inwardly from and substantially parallel to, the foldline portion of the article, the portion of an article between the perforated line and the foldline portion being removable to expose free edges of the films whereby the article is divisible into separate sections with each section comprising a pair of attached films whereby means can be inserted between the sections.

2. A method in accordance with claim 1 including the step of providing a heated die for simultaneously die cutting and heat sealing individual articles formed from said films.

3. A method in accordance with claim 1 including the step of die cutting the films into the shape of a hand.

4. A method in accordance with claim 1 including the step of providing a coating on said one exposed surface after said printing is applied, said coating preventing heat sealing of the printed portions together whereby said sections can be readily separated while the films making up each section are securely heat sealed to each other.

* * * * *